J. S. GOLDBERG.
GREASE CUP.
APPLICATION FILED SEPT. 2, 1914.
1,164,499.
Patented Dec. 14, 1915.
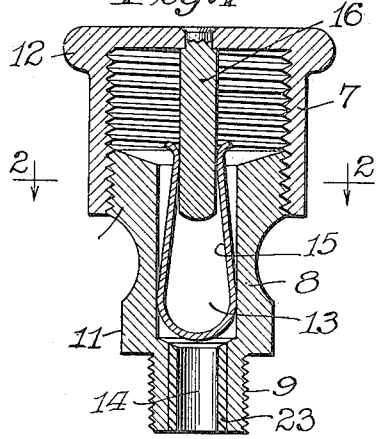
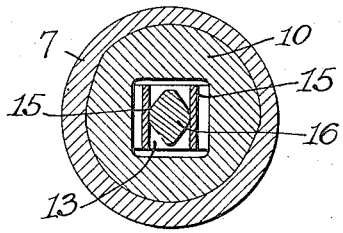
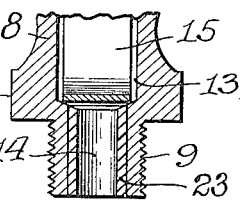
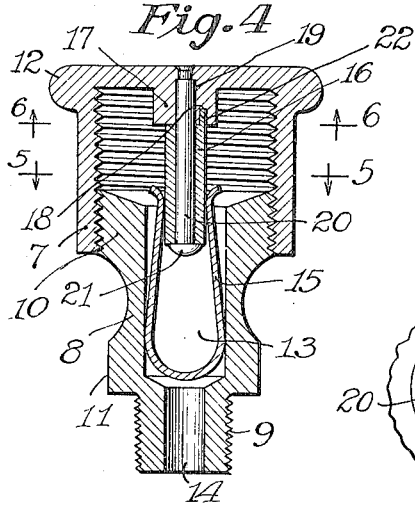
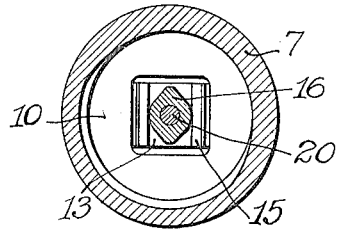
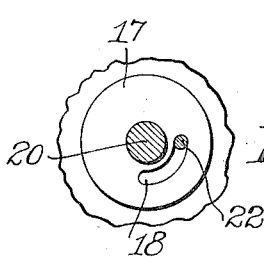
Witnesses:
Leonard W. Novander
Cameron A. Whitsett
Inventor
John S. Goldberg
By Brown, Hanson & Boettcher
Att'ys

UNITED STATES PATENT OFFICE.

JOHN S. GOLDBERG, OF CHICAGO, ILLINOIS, ASSIGNOR TO ALEMITE METALS COMPANY, OF CHICAGO, ILLINOIS, A CORPORATION OF ILLINOIS.

GREASE-CUP.

1,164,499.     Specification of Letters Patent.     Patented Dec. 14, 1915.

Application filed September 2, 1914. Serial No. 859,738.

*To all whom it may concern:*

Be it known that I, JOHN S. GOLDBERG, a citizen of the United States, residing at Chicago, in the county of Cook and State of Illinois, have invented a certain new and useful Improvement in Grease-Cups, of which the following is a full, clear, concise, and exact description, reference being had to the accompanying drawings, forming a part of this specification.

The subject matter of this invention is a compression grease cup.

Grease cups are the only practical means for lubricating exposed bearings, and are subject in general to rough treatment and the jarring and vibration of the parts to which they are attached. The jarring and vibration, as well as the pressure of the grease in the cup, tend to unscrew the parts whereby they may be lost and the interior of the cup exposed, at the same time, to the entry of grit or other foreign matter.

It is a primary object of this invention to provide improved means for preventing the unscrewing of the parts of a grease cup or similar device.

It is a further object of the invention to improve the construction and cheapen the cost of manufacture of a compression grease cup, or similar device.

In the accompanying drawings, Figure 1 is a vertical cross section of a grease cup embodying my invention; Fig. 2 is a cross section taken on the line 2—2 of Fig. 1; Fig. 3 is a fragmentary longitudinal section taken at right angles to the section of Fig. 1; Fig. 4 is a vertical longitudinal section of a modification; Fig. 5 is a cross section taken on the line 5—5 of Fig. 4; Fig. 6 is a fragmentary cross sectional view taken on the line 6—6 of Fig. 4.

The grease cup shown in Fig. 1 comprises essentially a cap or barrel 7 and a stem 8. The stem 8 is provided with a screw threaded nipple 9 for attaching the cup to the bearing, or the like, and a threaded portion 10 for engaging the threads on the inside of the barrel 7. This stem may be milled in hexagonal or octagonal form to provide faces 11 for gripping the stem with a wrench.

The barrel 7 may be knurled or provided with ears at the top 12 thereof, in order to facilitate screwing together of the parts 7 and 10. The stem 8 is provided with a rectangular bore 13, which connects with the bore 14 of the nipple 9. The space formed between the stem 8 and the barrel 7 communicates with the bore 13, and with the bore 14, to allow the passage of the grease to the bearing.

As a means for maintaining the cap in a given position, and preventing rotation, I provide a double flat spring 15, located in the rectangular bore 13, which spring coöperates with an eccentric stud 16 attached, as by riveting, or the like, to the top of the barrel 7. The stud 16 is preferably of flattened cross section so as to present eccentric surfaces to the gripping action of the spring 15. The upper ends of the spring 15 are preferably flared outward to facilitate the insertion of the stud 16 between the leaves of the spring, the end of the stud 16 preferably being round to facilitate this operation.

It can be seen that the grease will flow around the edges of the spring 15 and out through the bore 14 of the nipple. In this manner the spring forms no obstruction to the passage of the grease. The spring 15 may be withdrawn to clean out the bore of the cup, although this spring is held with considerable friction against the sides of the bore.

In the construction shown in Fig. 4, I have provided a lost motion connection between the stud 16 and the cap 7 in order to give the stud a snap effect and to insure its passing off of the dead center position with respect to the spring 15. The cap 7 is provided with a short axial boss 17, preferably cast integral therewith, and having a slot 18, (see Fig. 6), concentric with the axis thereof. This axial boss is perforated and has a counterbore 19 for receiving a shouldered pin 20, which is secured to the cap by riveting. The pin 20 forms a bearing for the stud 16 which, in this case, is in the form of a sleeve, and restrains the stud against endwise movement by the head 21 which is formed on the pin previous to its being riveted in place in the cap 7.

The stud 16 is provided with a pin 22 projecting into the slot 18 to give the stud a lost motion connection with the cap 7.

I may employ an iron sleeve 23 in the nipple 9, or in any of the other parts of the cup to serve as a reinforcing member. This is exceptionally valuable when the cup is made by die casting as the metal is of a crystalline structure.

The operation of the cup shown in Fig. 4 is similar to that of Fig. 1 with the addition that a positive snap action occurs when the stud 16 passes over the dead center position with respect to the spring 15, and in this manner, the locking action always tends to run ahead of the cap itself, and forms a secure means for holding the cap. A stud 16 in each case serves to center the cap to facilitate starting of the screw threads and inasmuch as there is no eccentric pressure there is no danger of crossing and jamming the threads. The spring 15 has no sharp bends and is protected by the sides of the stem from accidental bending or breaking. The parts may be formed of die castings, or in any other suitable manner.

Although the invention has been illustrated and described with reference to the details of a certain embodiment, it is not intended thereby to limit the invention, as it is capable of being practised in other forms than the ones I have illustrated, and modifications will be apparent to those skilled in the art, all of which I consider to come within the spirit and scope of the invention.

What I claim as new and desire to secure by Letters Patent of the United States is:

1. In a grease cup, a screw threaded stem having an enlarged axial bore, a spring mounted in said bore and held against rotation, a cap screw threaded to coöperate with said stem, an axial pin attached to said cap, an eccentric sleeve mounted on said pin, said sleeve engaging said spring, said sleeve having limited rotational motion with respect to said pin.

2. In a grease cup, a screw threaded stem having a rectangular bore, a double flat spring mounted in said bore, a cap screw threaded to coöperate with said stem, an axial boss formed on said cap, a pin mounted in said boss, a slot concentric with said pin formed in said boss, an eccentric sleeve on said pin, said sleeve having a projection extending into said slot, said sleeve and spring being in engagement when said cap and stem are screwed together.

3. In a grease cup, a screw threaded stem, a recurved spring member mounted in said stem, a screw threaded cap coöperating with said stem, a non-circular sleeve, an axial pin mounted on said cap for rigidly holding said sleeve in position, said pin being rounded and adapted to engage the ends of said spring for centering said cap and stem.

4. In a grease cup, a screw threaded stem, a spring mounted in said stem, a screw threaded cap coöperating with said stem, a pin mounted on said cap, an eccentric sleeve having rotation of movement of said pin, said sleeve engaging said spring.

In witness whereof, I hereunto subscribe my name this 20th day of August, 1914.

JOHN S. GOLDBERG.

Witnesses:
LEONARD W. NOVANDER,
JOHN A. DIENNER.